(12) United States Patent
Kosidlo, IV et al.

(10) Patent No.: US 7,789,606 B2
(45) Date of Patent: Sep. 7, 2010

(54) PUSH-IN NUT

(75) Inventors: John M. Kosidlo, IV, White Lake, MI (US); Bradley J. Jacobs, Royal Oak, MI (US); Lawrence W. Johnson, Taylor, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/149,561

(22) Filed: Jun. 10, 2005

(65) Prior Publication Data

US 2005/0226700 A1 Oct. 13, 2005

Related U.S. Application Data

(63) Continuation-in-part of application No. 10/858,213, filed on Jun. 1, 2004, now abandoned.

(60) Provisional application No. 60/558,695, filed on Apr. 1, 2004.

(51) Int. Cl.
*F16B 37/04* (2006.01)
*F16B 39/04* (2006.01)
*F16B 37/02* (2006.01)

(52) U.S. Cl. ............... 411/173; 411/182; 411/176; 411/174; 411/214; 411/215

(58) Field of Classification Search .......... 411/173, 411/182, 176, 174, 214, 215
See application file for complete search history.

(56) References Cited

U.S. PATENT DOCUMENTS

| | | | |
|---|---|---|---|
| 1,875,209 A | 8/1932 | Baldwin, Jr. | |
| 2,196,711 A | 4/1940 | Tinnerman | |
| 2,198,439 A | 4/1940 | Kost | |
| 2,222,449 A | 11/1940 | Tinnerman | |
| 2,258,845 A | 10/1941 | Burke | |
| 2,267,379 A * | 12/1941 | Tinnerman | 52/718.03 |
| 2,286,042 A | 6/1942 | Tinnerman | |
| 2,369,962 A * | 2/1945 | Gisondi | 411/523 |
| 2,562,001 A | 7/1951 | Tinnerman | |
| 2,707,013 A | 4/1955 | Flora et al. | |
| 2,873,496 A | 2/1959 | Elms | |
| 3,015,248 A | 1/1962 | Spurlin | |
| 3,118,480 A | 1/1964 | Kreider | |
| 3,802,033 A | 4/1974 | Gley | |
| 4,202,390 A | 5/1980 | Schenk | |
| 4,333,211 A | 6/1982 | Gunther | |
| 4,396,326 A * | 8/1983 | McKinnie et al. | 411/103 |
| 4,595,325 A | 6/1986 | Moran et al. | |
| 4,610,588 A | 9/1986 | Van Buren, Jr. et al. | |
| 4,729,706 A | 3/1988 | Peterson et al. | |
| 4,919,580 A | 4/1990 | Wright | |
| 4,925,351 A * | 5/1990 | Fisher | 411/182 |
| 5,306,091 A | 4/1994 | Zaydel et al. | |
| 5,645,384 A | 7/1997 | Wright et al. | |
| 5,725,343 A * | 3/1998 | Smith | 411/55 |
| 5,873,690 A * | 2/1999 | Danby et al. | 411/55 |
| 5,919,019 A | 7/1999 | Fischer | |

(Continued)

*Primary Examiner*—David Reese
(74) *Attorney, Agent, or Firm*—Mark W. Croll; Paul F. Donovan

(57) ABSTRACT

A self-locking panel nut fastener having a nut for being received within an opening in a panel which self-locks and upon receiving a threaded screw or bolt enhances the locking relationship with the panel.

26 Claims, 13 Drawing Sheets

U.S. PATENT DOCUMENTS

| | | |
|---|---|---|
| 6,095,734 A | 8/2000 | Postadan et al. |
| 6,141,837 A * | 11/2000 | Wisniewski .................. 24/295 |
| 6,379,092 B1 * | 4/2002 | Patel et al. .................... 411/61 |
| 6,691,380 B2 * | 2/2004 | Vassiliou ..................... 24/295 |
| 6,718,599 B2 * | 4/2004 | Dickinson et al. ............. 24/295 |
| 6,928,705 B2 * | 8/2005 | Osterland et al. ............. 24/295 |
| 7,120,971 B2 * | 10/2006 | Osterland et al. ............. 24/295 |

* cited by examiner

PUSH-IN NUT

This application is a continuation-in-part of U.S. patent application Ser. No. 10/858,213, filed Jun. 1, 2004, abandoned, which claims priority to U.S. Provisional Application Ser. No. 60/558,695, filed Apr. 1, 2004, which is herein incorporated by reference in its entirety.

FIELD OF THE INVENTION

The present invention relates to a self-locking panel nut fastener. In particular, the present invention relates to a nut for being received within an opening in a panel that self-locks and upon receiving a threaded screw or bolt enhances the locking relationship with the panel.

BACKGROUND

There are many situations in which panels have openings located inwardly of the edges to which it would be desirable to adhere other equipment or panels. A desirable means for accomplishing this would be the provision of a nut that could be readily positioned within the opening and self-lock on receiving a securing bolt or screw therein. This is especially desirable in those situations in which access is substantially confined to one side of the panel and where there is no easy means of tightening or otherwise securing or adjusting the nut position from the opposite side of the panel. These situations are frequently encountered, for example, in modern automotive vehicles.

U.S. Pat. No. 4,610,588 provides a fastener clip adapted for use with an associated fastener including a head portion having an aperture through which the fastener extends. Included in the fastener clip is a pair of integral, spaced apart legs extending from each side of the head portion. Each leg includes first and second portions with the second portion being bent back upon the first portion in a position spaced outwardly thereof. A finger portion is located at a free end of the second portion and extends inwardly toward and through an aperture in the first portion. When a tension load is imposed on the clip, connecting zones between the first and second portions of each leg are deflected toward each other to apply a clamping force to a fastener extending there between. A limitation with this fastener clip is that it is not configured for use with panel openings having uneven edges (e.g., burred edges, flanged edges).

U.S. Pat. No. 5,645,384 provides a release fastener with a first element providing a retention mechanism for engaging and retaining a stud of the fastener. A second element having a pair of flexible elongate components is spaced from the first by a bight portion and has a pair of transverse tabs disposed adjacent to the bight portion. These are adapted to engage one face of a support, in an aperture of which the receptacle is mounted. In use, the bight portion engages the other face. A third element is disposed at the opposite end of the second element from the bight portion and has a flexible barb portion arranged to flex on insertion of the receptacle in the aperture and to engage the other face after insertion in order to retain the receptacle in the aperture. A limitation with this release fastener is that upon insertion of a stud, the retention force is weak, and a general loosening of the device occurs over time.

U.S. Pat. No. 5,919,019 provides a nut for mounting into an opening located in the central part of a panel including a sleeve and resilient locking trips and panel edge securing means extending from opposite sides of the nut. When the nut is positioned within the opening the locking strips obstruct removal from the opening. On a bolt being fully received within the sleeve both the strips and edge securing means engage the panel. A limitation with this nut is that installation of the nut requires a high amount of insertion force.

U.S. Pat. No. 6,095,734 provides a push-nut fastener having a substantially planar base portion from which a cylindrical sleeve is drawn and internally threaded. A pair of angled leg portions extending from opposing lateral edges of the base portion, each including a laterally extending tab partially extending into a space formed between said leg portions for engaging threads of a mating male fastener. Inner and outer leg sections preferably define the leg portions. Each outer leg section includes an inwardly angled section that engages the edges of a mounting hole of a panel into which the push-nut is seated during assembly. A limitation with this fastener clip is that it is not configured for use with panel openings having uneven edges (e.g., burred edges, flanged edges).

What are needed are push-in nut fasteners configured for use with uneven panel opening edges. Additionally, what are needed are push-in nut fasteners with improved insertion ergonomics. Additionally, what are needed are improved push-in nut fasteners that do not loosen over time.

SUMMARY

The present invention relates to a self-locking panel nut fastener. In particular, the present invention relates to a nut for being received within an opening in a panel that self-locks and upon receiving a threaded screw or bolt enhances the locking relationship with the panel.

In certain embodiments, the present invention provides a push-in nut fastener, comprising a planar surface with proximal and distal ends; a sleeve extending from the planar surface; a cantilever integral with the planar surface and extending away from the planar surface distal end in a plane that is approximately parallel to and below the planar surface; and a retention arm integral with the planar surface and extending from the planar surface proximal end so that the retention arm is positioned at least partially beneath the sleeve.

In further embodiments, the sleeve comprises internal threads that receive a threaded fastener. In preferred embodiments, the sleeve is approximately perpendicular to the planar surface. In other embodiments, the push-in nut fastener is formed from sheet metal. In preferred embodiments, the sheet metal is spring steel. In further embodiments, the cantilever extends beyond the distal end of the planar surface. In even further embodiments, the retention arm is deflectable by a threaded fastener inserted into the sleeve.

In certain embodiments, the present invention provides a push-in nut fastener for insertion into a panel opening within a panel having upper and lower surfaces, the push-in nut comprising a planar surface having proximal and distal ends; a sleeve extending outwardly from the planar surface; a cantilever integral with and extending away from the planar surface distal end in a plane that is approximately parallel to and beneath the planar surface so that when the push-in nut fastener is inserted into the panel opening the cantilever engages the bottom surface of the panel and the planar surface engages the upper surface of the panel; and a retention arm integral with and extending away from the planar surface proximal end at an angle so that the retention arm is positioned at least partially beneath the sleeve so that when the push-in nut is inserted into the panel opening the retention arm engages the lower surface of the panel to secure the proximal end of the push-in nut fastener in the panel.

In further embodiments, the push-in nut is formed from sheet metal. In further embodiments, the sheet metal is spring steel. In yet further embodiments, the sleeve is approximately perpendicular to the planar surface. In preferred embodiments, the sleeve comprises internal threads that receive a threaded fastener. In further embodiments, the cantilever provides a leverage force against the lower surface of the panel upon insertion of the push-in nut fastener into the panel opening. In even further embodiments, the cantilever is curvilinear. In other preferred embodiments, the retention arm extends toward the planar surface distal end. In further embodiments, the retention arm is deflectable by a threaded fastener inserted into the sleeve. In yet further embodiments, deflection of the retention arm increases the angle between the planar surface and the retention arm.

In certain embodiments, the present invention provides a push-in nut fastener for insertion into a panel opening within a panel having upper and lower surfaces, the push-in nut comprising a planar surface with proximal and distal ends, wherein the planar surface contacts the upper surface of the panel to prevent the push-in nut fastener from being displaced through the panel opening; a sleeve extending outwardly from the planar surface, wherein the sleeve comprises internal threads to secure the threaded fastener; a cantilever integral with and extending away from the planar surface in a plane that is approximately parallel to and below the planar surface so that the cantilever extends beyond the planar surface distal end; and a retention arm integral with and extending away from the planar surface proximal end at an angle to a position at least partially below the sleeve, wherein upon insertion of the push-in nut fastener into the panel opening the planar surface engages the upper surface of the panel and the cantilever engages the bottom surface of the panel and thereby providing leverage for insertion of the proximal end of the push-in nut fastener and the retention arm into the panel opening so that the retention arm engages the lower surface of the panel and wherein the retention arm is deflectable by a threaded fastener inserted into the sleeve so that the retention arm exerts pressure against the threaded fastener and the lower surface of the panel.

In certain embodiments, the present invention provides a push-in nut fastener, comprising a planar surface with proximal and distal ends; a sleeve extending from the planar surface; a cantilever integral with the planar surface and extending away from the planar surface distal end in a plane that is approximately parallel to and below the planar surface; and a retention arm integral with the planar surface and extending from the planar surface proximal end so that the retention arm is positioned at least partially beneath the sleeve.

In further embodiments, the sleeve comprises internal threads that receive a threaded fastener. In preferred embodiments, the sleeve is approximately perpendicular to the planar surface. In other embodiments, the push-in nut fastener is formed from sheet metal. In preferred embodiments, the sheet metal is spring steel. In further embodiments, the cantilever extends beyond the distal end of the planar surface. In even further embodiments, the retention arm is deflectable by a threaded fastener inserted into the sleeve.

In further embodiments, the planar surface is molded with a plastisol pad. In preferred embodiments, the planar surface has therein at least one strengthening rib.

In certain embodiments, the present invention provides a push-in nut fastener, comprising a planar surface with proximal and distal ends; a sleeve extending from the planar surface, the sleeve having an axis extending through a center thereof and substantially perpendicular to the planar surface; a cantilever integral with the planar surface; a retention arm having a retention arm tail, the retention arm integral with the planar surface and extending from the planar surface proximal end so that the retention arm is positioned at least partially beneath the sleeve, such that at least a portion of the retention arm extends across the axis, the retention arm further comprising a retention arm tail flap extending from the retention arm tail; wherein upon insertion of the push-in nut fastener into an opening the retention arm tail flap engages the edge of the panel opening.

In preferred embodiments, the planar surface is molded with a plastisol pad. In preferred embodiments, the planar surface having therein at least one strengthening rib.

In preferred embodiments, the sleeve comprises internal threads that receive a threaded fastener. In other preferred embodiments, the sleeve is approximately perpendicular to the planar surface.

In preferred embodiments, the push-in nut fastener is formed from sheet metal. In other preferred embodiments, the sheet metal is spring steel.

In preferred embodiments, the cantilever extends beyond the distal end of the planar surface. In other preferred embodiments, the retention arm is deflectable by a threaded fastener inserted into the sleeve. In preferred embodiments, the engaging of the retention arm tail flap with the opening prevents rattling of the push-in nut fastener.

FIGURE DESCRIPTION

DETAILED DESCRIPTION

The following discussion relates to a push-in nut fastener in accordance with certain preferred embodiments of the present invention. The push-in nut fasteners of the present invention have numerous advantages over previous prior art devices including, but not limited to, an ability to cover a larger panel thickness range in comparison to typical designs, improved installation ergonomics, improved use with burred or flanged panel opening edges, decreased potential for rattling, and improved strength of the device. FIGS. 1-13 illustrate various preferred embodiments of the push-in nut fasteners of the present invention. The present invention is not limited to these particular embodiments.

Figure 1:
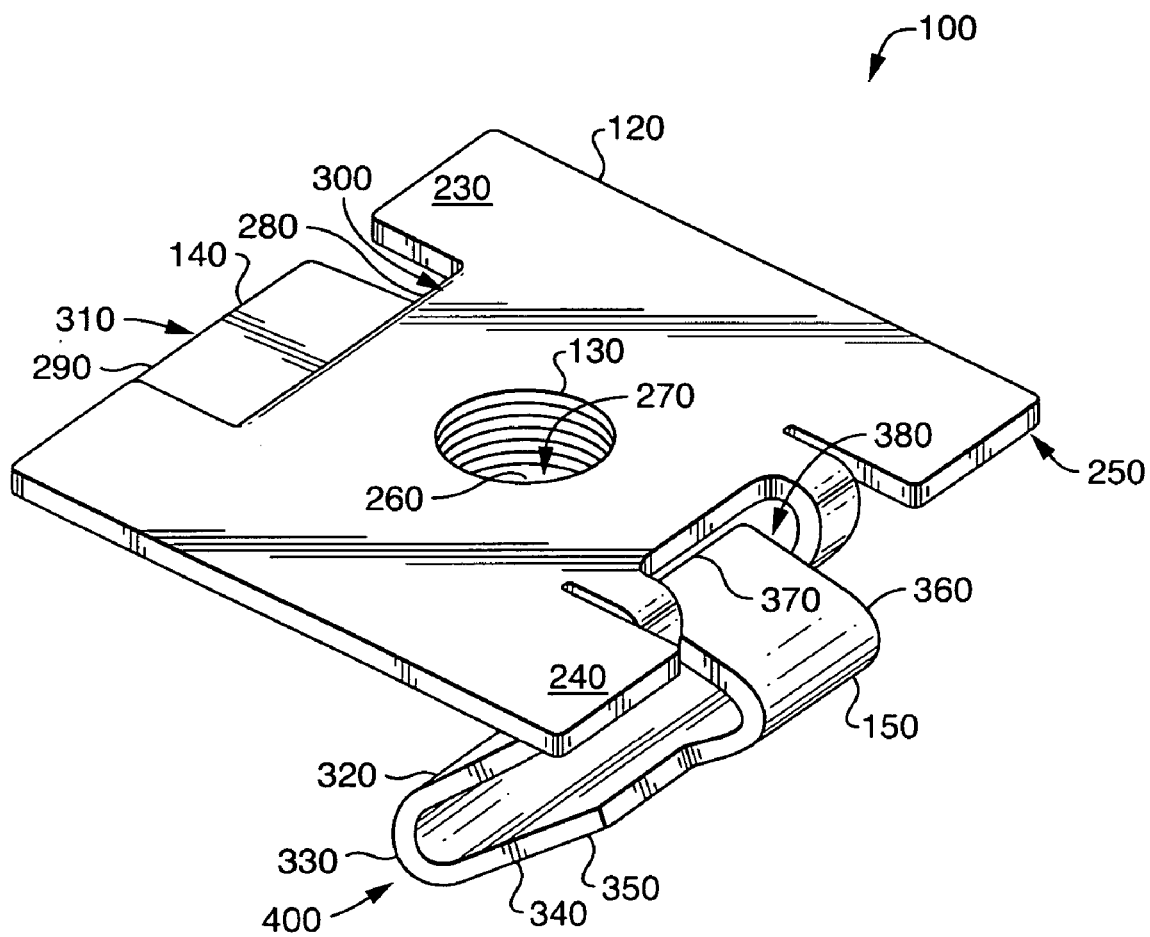
FIG. 1 illustrates a side overhead view of a push-in nut fastener embodiment.

Referring to FIG. 1, the push-in nut fastener 100 comprises a planar surface 120, a sleeve 130, a cantilever 140, and a retention arm 150. The push-in nut fastener 100 is not limited to a particular material composition (e.g., steel, wood, plastic, or mixture thereof). In preferred embodiments, the material composition of the push-in nut 100 is sheet metal (e.g., steel). In particularly preferred embodiments, the composition of the push-in nut 100 is spring steel.

Figure 2:
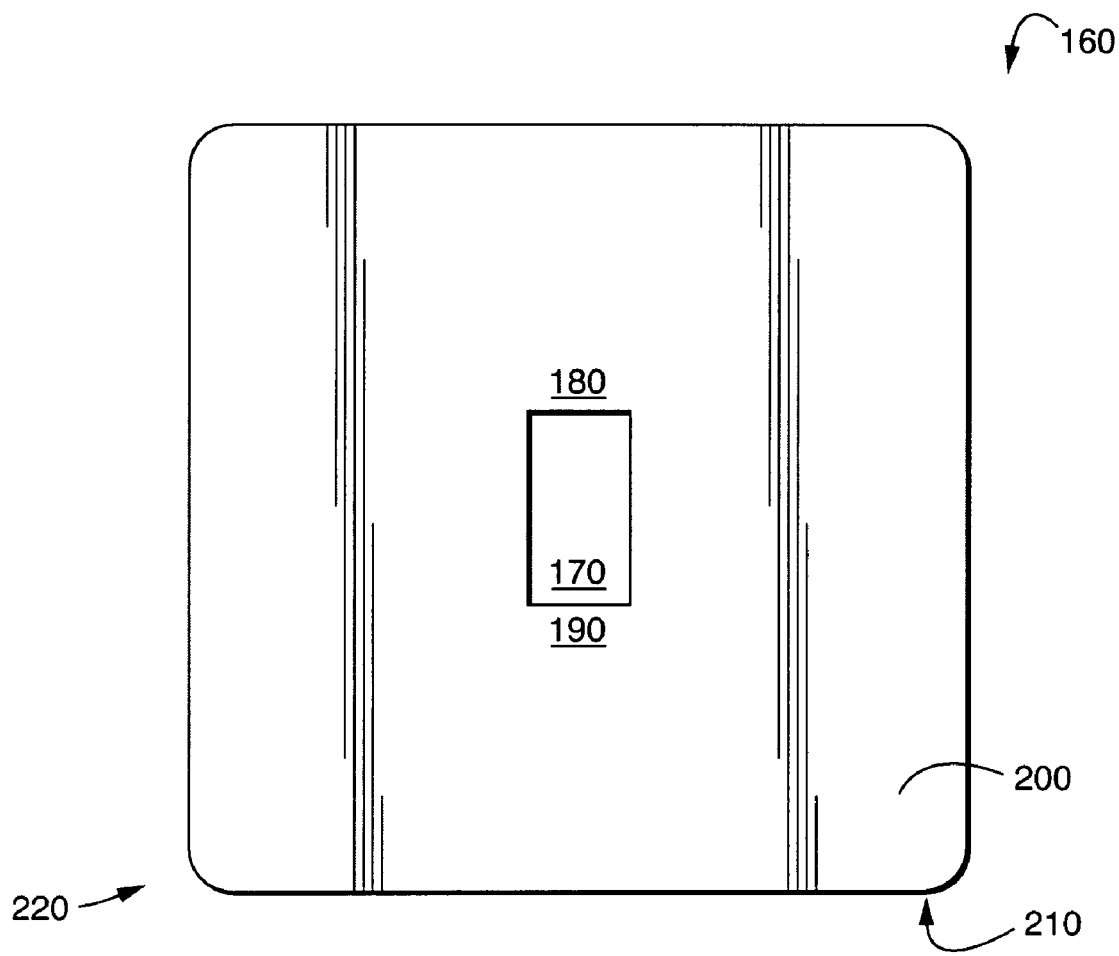
FIG. 2 illustrates an overhead view of a panel.

FIG. 2 generally presents a panel 160 (e.g., workpieces) designed for use with the present invention. Panels 160 finding use within the present invention have a panel opening 170 therein with a panel opening proximal end 180 and a panel opening distal end 190. A panel 160 has a panel upper surface 200 and a panel lower surface 210. Additionally, the panel 160 and panel opening 170 are located in a panel plane 220.

Figure 3:
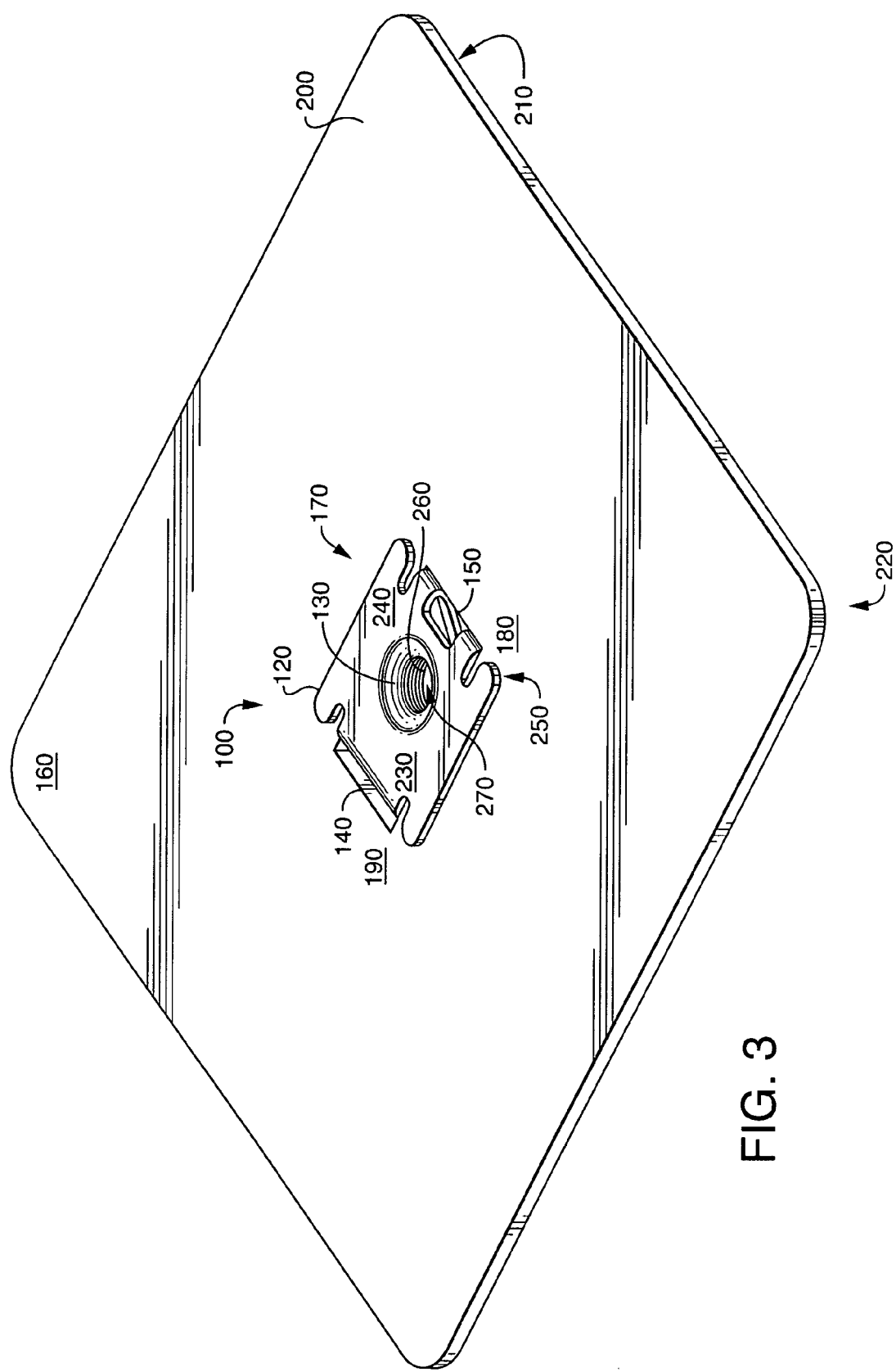
FIG. 3 illustrates a side overhead view of a push-in nut fastener embodiment secured within a panel.

FIG. 3 illustrates a push-in nut fastener 100 secured with a panel 160. In particular, the push-in nut fastener 100 is insertable into the panel opening 170 with the sleeve 130, cantilever 140, and retention arm 150 fitting within the panel opening 170 and the planar surface 120 located above the panel opening 170 and panel plane 220.

Referring again to FIG. 1, the push-in nut fastener 100 comprises a planar surface 120. The planar surface 120 comprises a planar surface distal end 230 and a planar surface proximal end 240. The planar surface 120 is not limited to a particular shape (e.g., rectangular, square, circular). In preferred embodiments, the planar surface 120 is square shaped. The planar surface 120 is not limited to particular size dimensions. Additionally, the planar surface 120 has a planar surface plane 250.

Referring to FIG. 3, the planar surface 120 serves as a platform for securing the push-in nut fastener 100 with a panel 160. In preferred embodiments, the size dimensions of the planar surface 120 are large enough to prevent the push-in nut fastener 100 from falling through a panel opening 170. In such embodiments, the planar surface distal end 230 and planar surface proximal end 240 overlap the panel opening proximal end 180 and panel opening distal end 190 thereby preventing the push-in nut fastener 100 from falling through the panel opening 170. Additionally, upon insertion of a push-in nut fastener 100 into a panel opening 170, the planar surface plane 250 is in substantially parallel alignment with the panel plane 220.

Referring to FIG. 1, the push-in nut fastener 100 comprises a sleeve 130. The sleeve 130 has a sleeve opening 260. The sleeve opening 260 is not limited to a particular positioning within the push-in nut fastener 100. In preferred embodiments, the sleeve opening 260 extends through the planar surface 120. In preferred embodiments, the sleeve 130 is positioned at the center of the planar surface 120. In further preferred embodiments, the sleeve opening 260 extends through the bottom of the planar surface 120. The sleeve 130 is not limited to particular size dimensions. In preferred embodiments, the sleeve 130 is either drawn or roll-formed.

Figure 4:
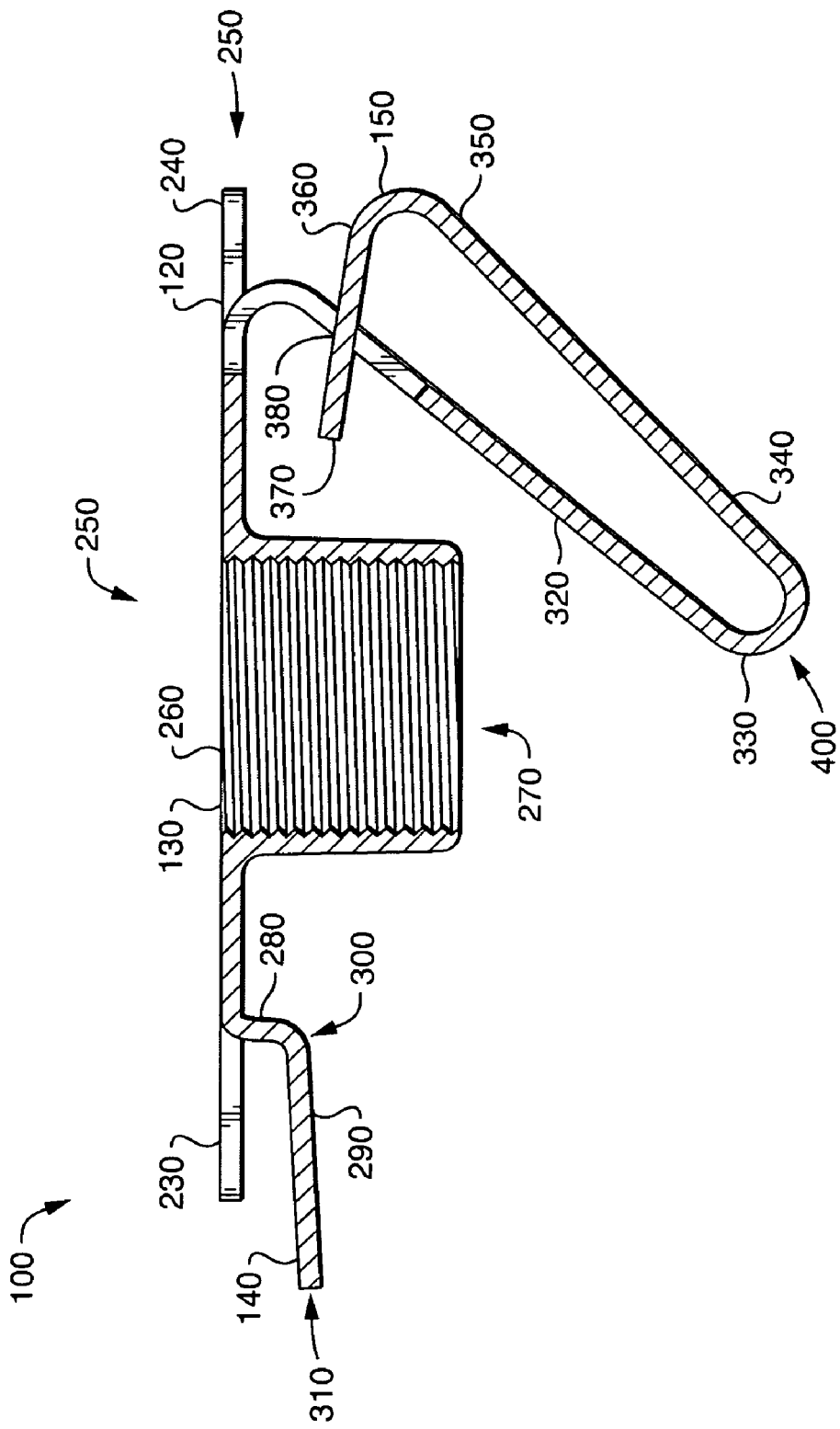
FIG. 4 illustrates a cross sectional side view of a push-in nut fastener embodiment.

Still referring to FIG. 1, the sleeve 130 has a sleeve axis 270. In preferred embodiments, the sleeve axis 270 is in substantially perpendicular alignment with the planar surface plane 250. FIG. 4 presents a cross sectional side view of a push-in nut fastener 100 and illustrates that the sleeve axis 270 is in substantially perpendicular alignment with the planar surface plane 250. Referring to FIG. 3, upon insertion of a push-in nut fastener 100 into a panel opening 170, the sleeve axis 270 is in substantially perpendicular alignment with the planar surface plane 250 and the panel plane 220.

Figure 5:
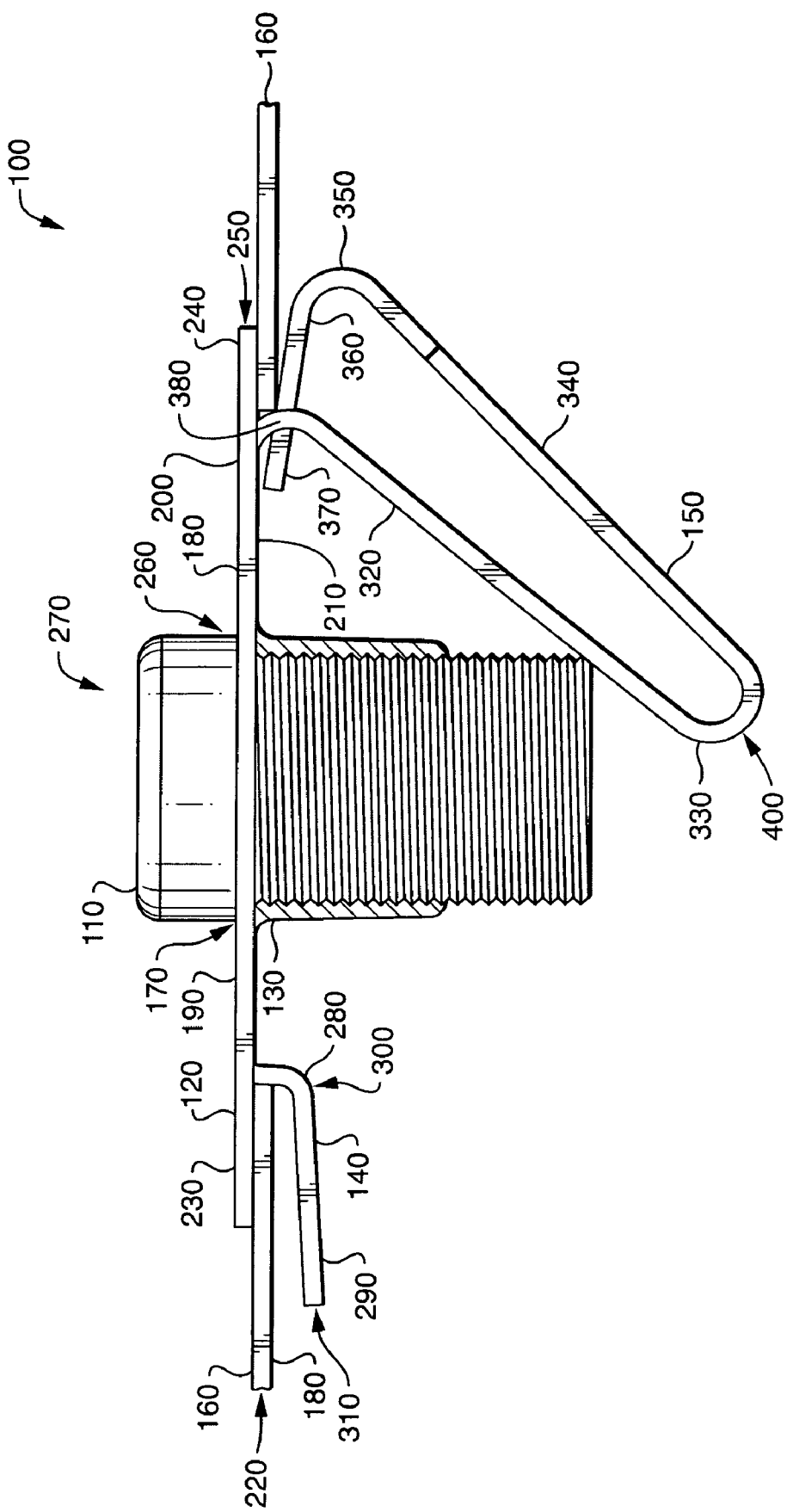
FIG. 5 illustrates a side view of a threaded fastener in a push-in nut fastener embodiment secured within a panel.

FIG. 5 illustrates a side view of a threaded fastener 110 secured within a push-in nut fastener 100 secured in a panel opening 170. Threaded fasteners 110 refer to hardware agents comprising a threaded face and a head. Examples include, but are not limited to, threaded workpieces, nuts, screws, set screws, grub screws, threaded bolts, and the like. The sleeve 130 serves to secure threaded fasteners 110 within the push-in nut fastener 100. The sleeve 130 is not limited to securing a particular type of threaded fastener (e.g., threaded workpieces, nuts, screws, set screws, grub screws, threaded bolts). In preferred embodiments, a threaded fastener 110 is twisted down through the sleeve opening 260.

Referring to FIG. 1, the push-in nut fastener 100 comprises a cantilever 140 extending from the planar surface 120. The cantilever 140 is not limited to a particular positioning on the push-in nut fastener 100. In preferred embodiments, the cantilever 140 is positioned at the planar surface distal end 230. Referring to FIG. 3, upon insertion of a push-in nut fastener 100 in a panel opening 170, the cantilever 140 fits into the panel opening 170.

Referring to FIG. 4, the cantilever 140 comprises a cantilever downwardly extending member 280, and a cantilever horizontal member 290 extending from the cantilever downwardly extending member 280. The cantilever downwardly extending member 280 extends downward from the planar surface distal end 230 at a predetermined angle (e.g., 0-degrees, 10-degrees, 45-degrees, 90-degrees, 120-degrees). In preferred embodiments, the cantilever downwardly extending member 280 extends downward from the planar surface distal end 230 at approximately a 90-degree angle. The cantilever downwardly extending member 280 is not limited to particular size dimensions.

Referring to FIG. 4, the cantilever 140 further comprises a cantilever downwardly extending member plane 300. In preferred embodiments, the cantilever downwardly extending member plane 300 is in approximately perpendicular alignment with the planar surface plane 250. Referring to FIG. 5, upon insertion of a threaded fastener 110 within a push-in nut fastener 100 secured within a panel 160, the cantilever downwardly extending member plane 300 is in approximately perpendicular alignment with the planar surface plane 250 and the panel plane 220.

Figure 6:
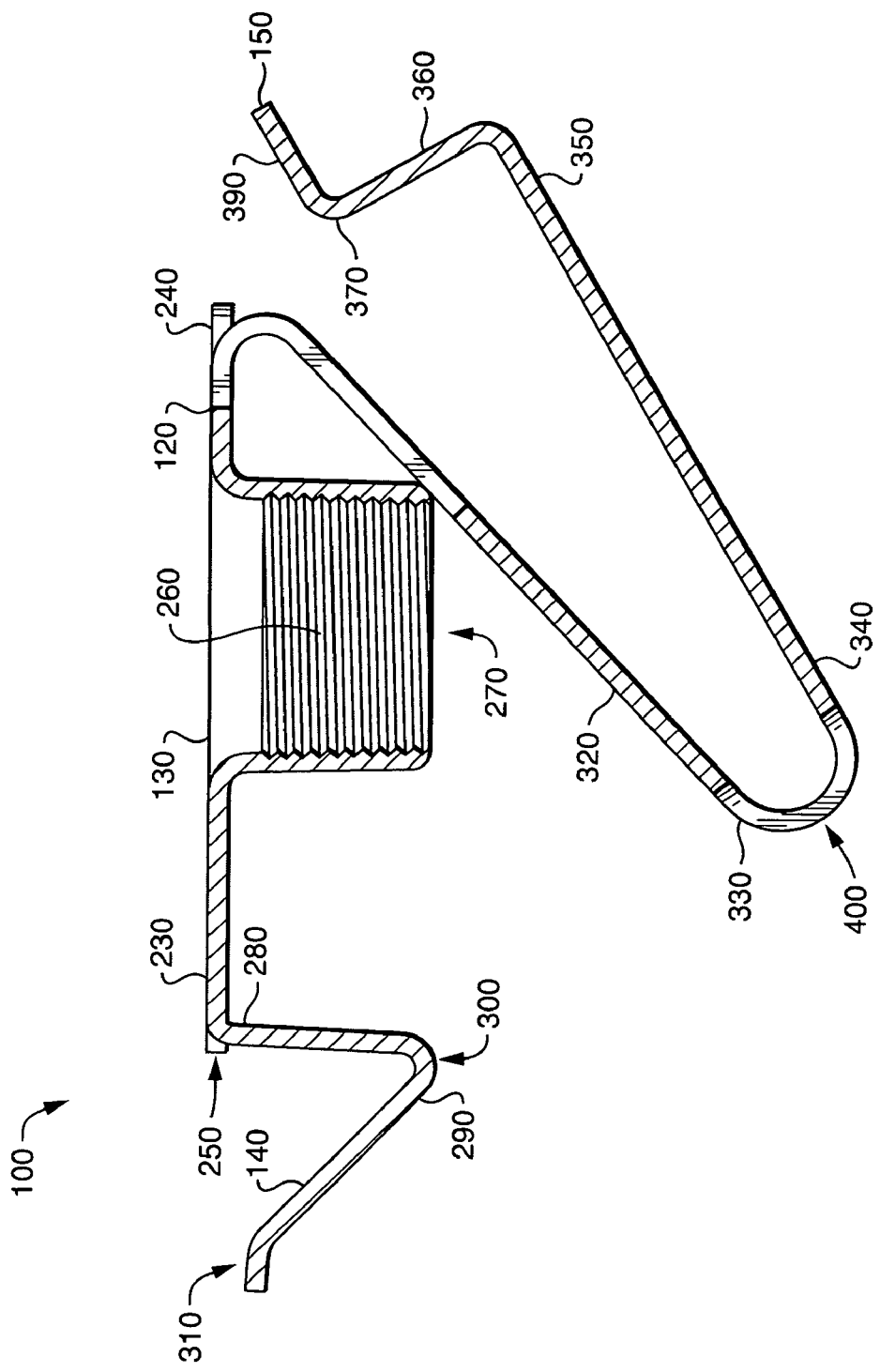
FIG. 6 illustrates a cross sectional side view of a push-in nut fastener embodiment.

Referring to FIG. 4, the cantilever horizontal member 290 extends from the cantilever downwardly extending member 280 at a predetermined angle (e.g., 0-degrees, 10-degrees, 45-degrees, 90-degrees, 120-degrees). In preferred embodiments, the cantilever horizontal member 290 extends from the cantilever downwardly extending member 280 at approximately a 90-degree angle. In preferred embodiments, the cantilever horizontal member 290 extends from the cantilever downwardly extending member 280 in a proximal to distal direction. In other preferred embodiments, as shown in FIG. 6, the cantilever horizontal member 290 extends from the cantilever downwardly extending member 280 at approximately a 45-degree angle. In such preferred embodiments, the cantilever horizontal member 290 extends from the cantilever downwardly extending member 280 in a proximal to distal direction.

Referring to FIGS. 4 and 6, in particularly preferred embodiments, the length of the cantilever horizontal member 290 extends beyond the length of the planar surface distal end 230. In such embodiments, the cantilever horizontal member 290 is not limited to a particular distance extension beyond the planar surface distal end 230.

The cantilever horizontal member 290 is not limited to particular size dimensions. As shown in FIG. 4, in some preferred embodiments, the cantilever horizontal member 290 is shaped in a linear fashion. As shown in FIG. 6, in some preferred embodiments, the cantilever horizontal member 290 is shaped in a curvilinear fashion. In such embodiments, a cantilever horizontal member 290 shaped in a curvilinear fashion secures panel openings 170 with protruding rims (discussed in more detail below).

Referring to FIG. 4, the cantilever 140 further comprises a horizontal member plane 310. In some preferred embodiments, the cantilever horizontal member plane 310 is in approximately parallel alignment with the planar surface plane 250, and in approximately perpendicular alignment with the cantilever downwardly extending member plane 300. As shown in FIG. 6, in other preferred embodiments, the cantilever horizontal member plane 310 is in approximately a 45-degree angle alignment with the planar surface plane 250, and in approximately a 45-degree angle alignment with the cantilever downwardly extending member plane 300.

Referring to FIG. 5, in some preferred embodiments, upon insertion of a threaded fastener 110 in a push-in nut fastener 100 secured within a panel opening 170, the cantilever horizontal member plane 310 is in approximately parallel alignment with the planar surface plane 250 and the panel plane 220, and in approximately perpendicular alignment with the cantilever downwardly extending member plane 300.

Figure 7:
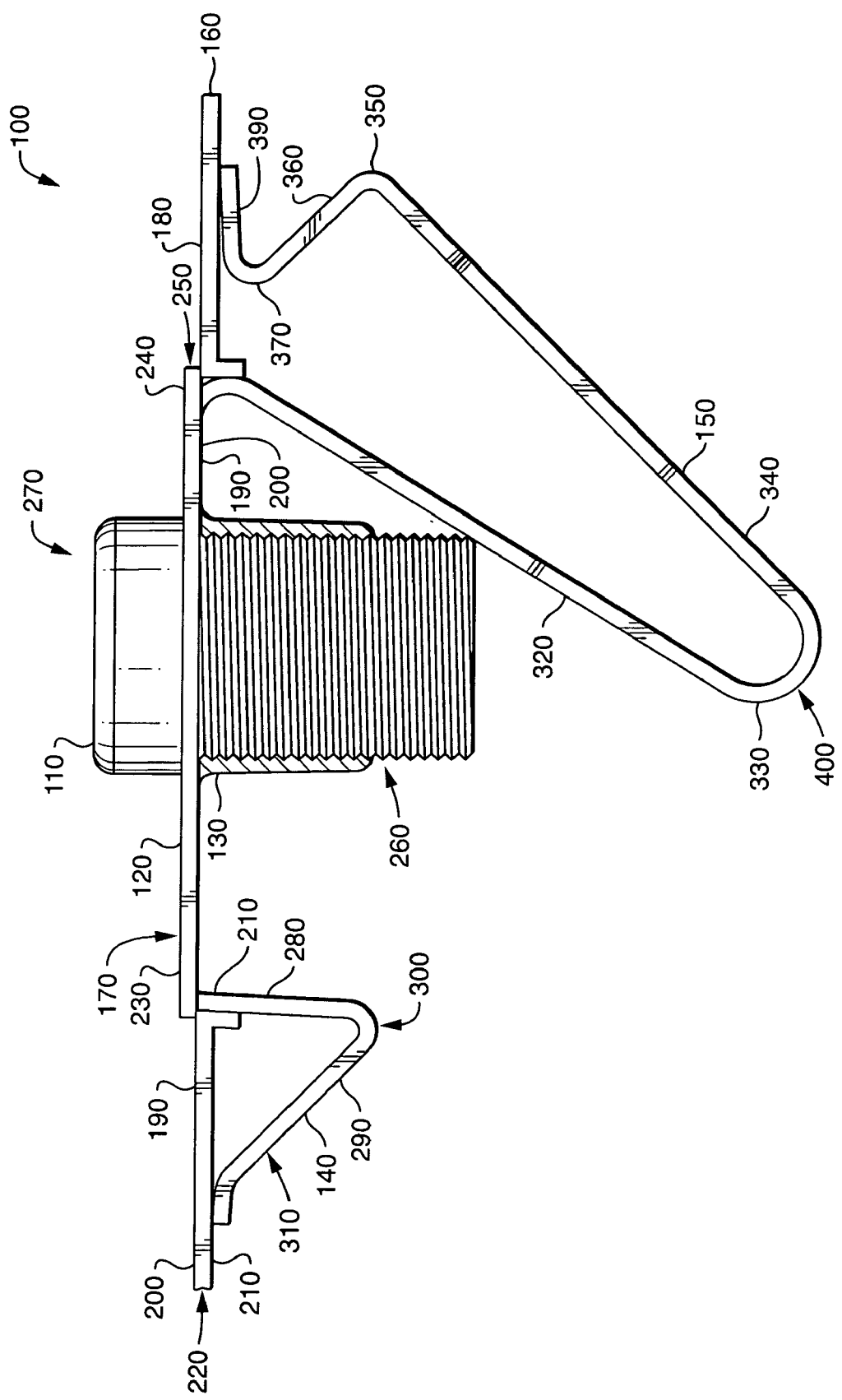
FIG. 7 illustrates a side view of a threaded fastener in a push-in nut fastener embodiment secured within a panel.

In other preferred embodiments, as shown in FIG. 7, upon insertion of a threaded fastener 110 in a push-in nut fastener 100 secured within a panel opening 170, the cantilever horizontal plane 310 is in approximately a 45-degree angle alignment with the planar surface plane 250 and the panel plane 220, and in approximately a 45-degree angle alignment with the cantilever downwardly extending member plane 300.

Referring to FIG. 5, a linearly shaped cantilever horizontal member 290 secures push-in nut fasteners 100 with even edged panel openings 170. In such preferred embodiments, the panel 160 fits between the cantilever horizontal member 290 and the planar surface distal end 230. Referring to FIG. 7, a curvilinearly shaped cantilever horizontal member 290 secures push-in nut fasteners 100 in panel openings 170 with protruding rim (e.g., uneven panel opening edges, burred edges, flanged edges). In such preferred embodiments, the protruding rim of a panel opening 170 fits against the cantilever downwardly extending member 280 and against the distal end of the cantilever horizontal member 290. As such, the curvilinear shaped cantilever horizontal member 290 accommodates panel openings 170 with protruding rims.

Referring to FIGS. 5 and 7, the cantilever 140 provides a leverage force as the push-in nut fastener 100 is inserted into a panel opening 170. In particular, insertion of the push-in nut fastener 100 into the panel opening 170 requires placement of the planar surface 120 over the panel opening 170 and placement of the cantilever 140 underneath the panel opening distal end 190. As the push-in nut fastener 100 is inserted into the panel opening 170, the retention arm 140 is lowered through panel opening proximal end 180 (as discussed in more detail below). The cantilever 140 provides a leverage force against the panel lower surface 164 as the push-in nut fastener 100 is inserted into the panel opening 170.

Referring to FIG. 1, the push-in nut fastener 100 comprises a retention arm 150. The retention arm 150 comprises a retention arm proximal flap 320 with a retention arm proximal flap distal end 330, a retention arm distal flap 340 with a retention arm distal flap distal end 350, and a retention arm tail 360 with a retention arm tail distal end 370. The retention arm 150 further comprises a retention arm plane 400.

Referring to FIG. 4, the retention arm proximal flap 320 extends downward from the planar surface proximal end 240 at a predetermined angle (e.g., 0-degrees, 10-degrees, 45-degrees, 90-degrees, 120-degrees). In preferred embodiments, the retention arm proximal flap 320 extends downward from the planar surface proximal end 240 at approximately a 45-degree angle. In preferred embodiments, the direction of retention arm proximal flap 320 extension is from the planar surface proximal end 240 toward the proximal surface distal end 230. The retention arm proximal flap 320 is not limited to particular size dimensions. As shown in FIG. 1, in some preferred embodiments, the retention arm proximal flap 320 has a retention arm proximal flap opening 380. In such preferred embodiments, the retention arm tail 360 is positioned within the retention arm proximal flap opening 380 (discussed in more detail below).

Figure 8:
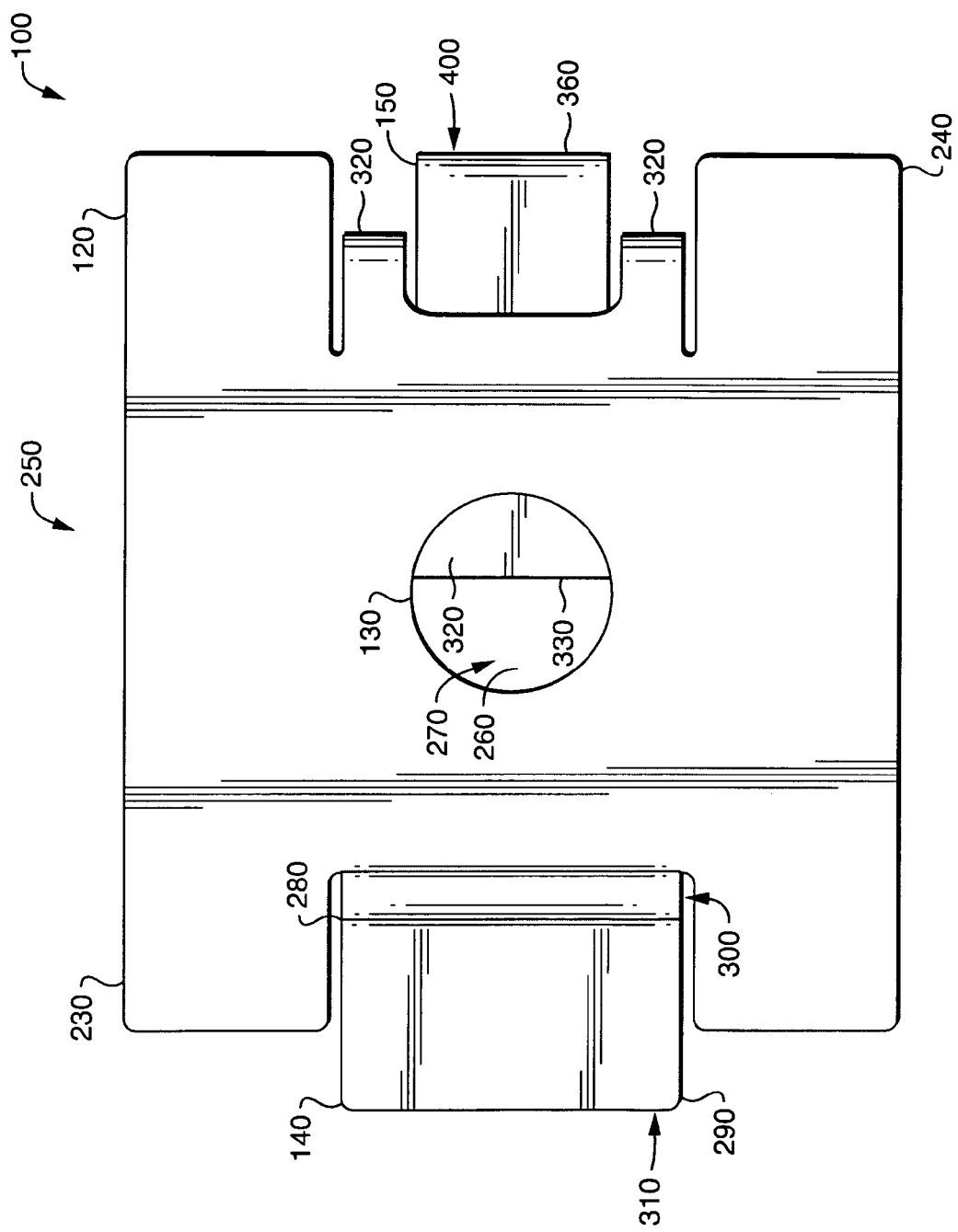
FIG. 8 illustrates an overhead view of a push-in nut fastener embodiment.

Referring to FIG. 4, in particularly preferred embodiments, the retention arm proximal flap 320 extends beneath the sleeve 130. FIG. 8 provides an overhead perspective of the retention arm proximal flap 320 extending beneath the sleeve 130. Referring to FIG. 5, upon insertion of a threaded fastener 110 into a push-in nut fastener 100 secured within a panel 160, the retention arm 150 is deflected upon the panel lower surface 180. Deflection of the retention arm 150 upon the panel lower surface 180 increases the securing of the push-in nut fastener 100 with the panel 160 (discussed in more detail below).

Referring to FIG. 1, the retention arm distal flap 340 extends from the retention arm proximal flap distal end 330 at a predetermined angle (e.g., 0-degrees, 10-degrees, 45-degrees, 90-degrees, 120-degrees). In preferred embodiments, the retention arm distal flap 290 extends from the retention arm proximal flap distal end 330 at approximately a 20-degree angle. The direction of retention arm distal flap 340 extension is toward the planar surface proximal end 240. The retention arm distal flap 290 is not limited to particular size dimensions. FIG. 4 provides a cross section side view of a push-in nut fastener with a retention arm proximal distal flap 340 extending from the retention arm proximal flap distal end 330 at approximately a 20-degree angle. FIG. 5 provides a side view of a threaded fastener 110 in a push-in nut fastener 100 secured within a panel 160 with a retention arm proximal distal flap 340 extending from the retention arm proximal flap distal end 330 at approximately a 20-degree angle.

Referring to FIG. 1, the retention arm tail 360 extends from the retention arm distal flap distal end 350 at a predetermined angle (e.g., 0-degrees, 10-degrees, 45-degrees, 90-degrees, 120-degrees). The retention arm tail 360 is not limited to particular size dimensions. As shown in FIG. 1, in some preferred embodiments, the retention arm tail 360 extends from the retention arm distal flap distal end 350 at approximately a 45-degree angle. In such preferred embodiments, the retention arm tail 360 extends through the retention arm proximal flap opening 380. Referring to FIG. 5, upon insertion of a threaded fastener 110 into a push-in nut fastener 100 secured within a panel opening 170, the retention arm tail 360 extending through the proximal flap opening 380 is in contact with the panel lower surface 180. Contacting the panel lower surface 180 with the retention arm tail 360 increases the securing of the push-in nut fastener 100 with the panel 160 (discussed in more detail below).

Figure 9:
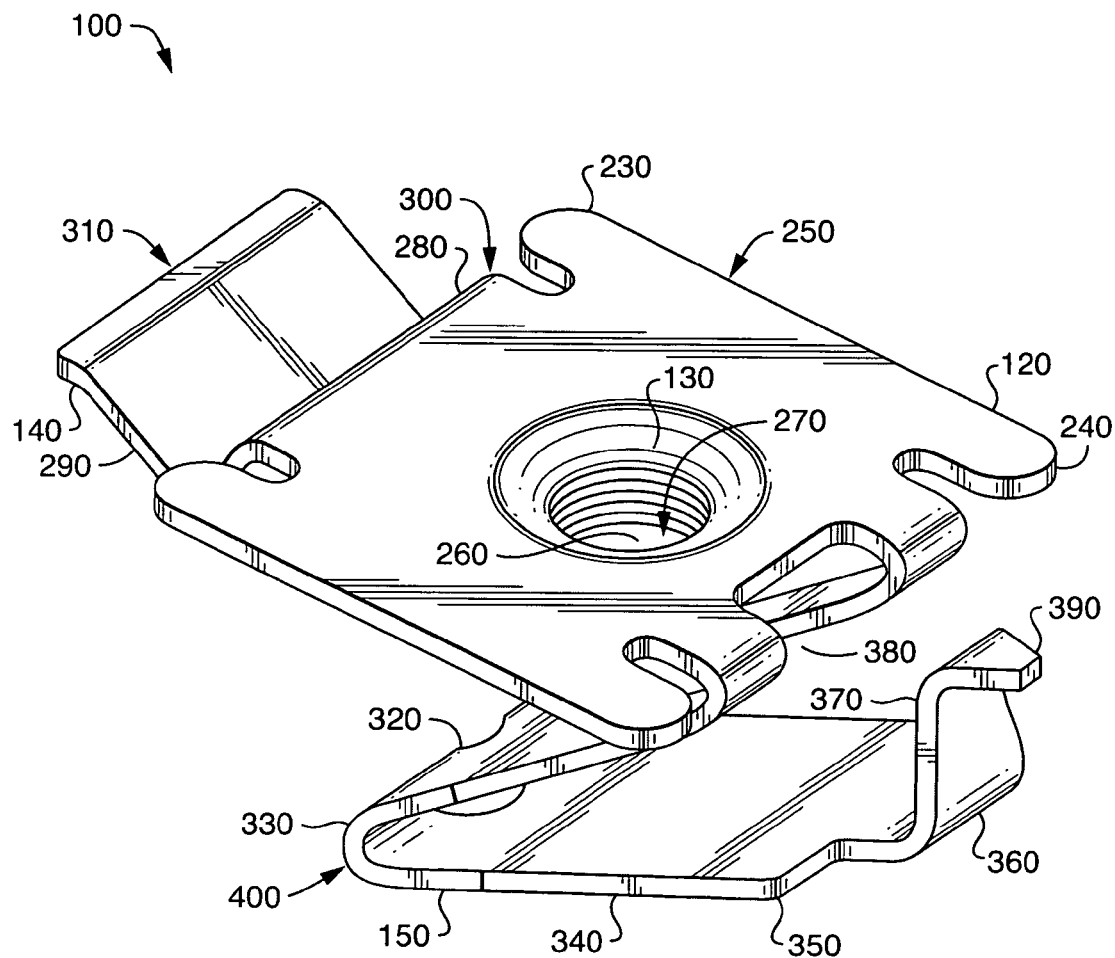
FIG. 9 illustrates a side overhead view of a push-in nut fastener embodiment.
Figure 10:
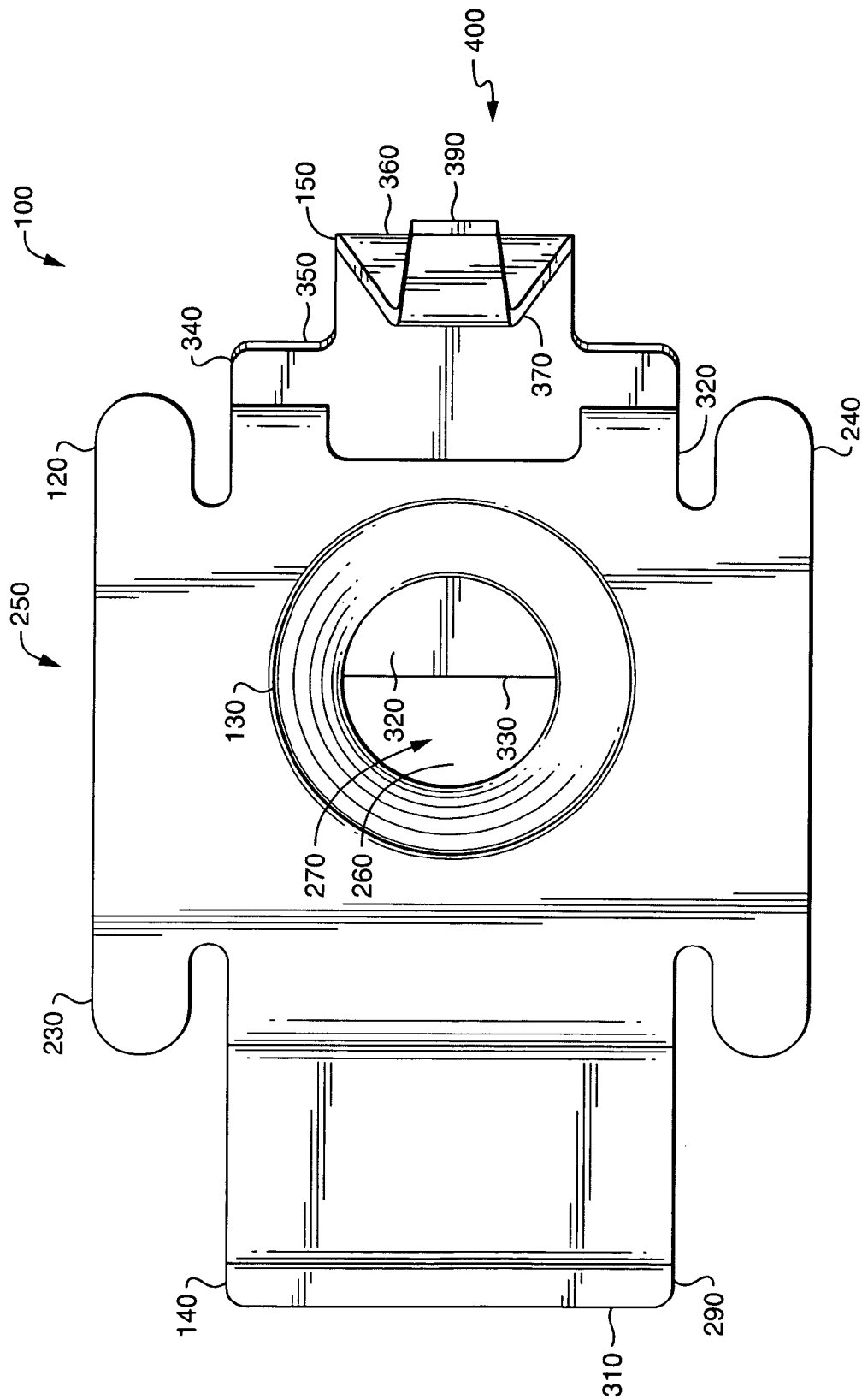
FIG. 10 illustrates an overhead view of a push-in nut fastener embodiment.

As shown in FIG. 9, in other preferred embodiments, the retention arm tail 360 extends from the retention arm distal flap distal end 350 at approximately a 90-degree angle in a direction toward the planar surface 120. In some preferred embodiments, the retention arm tail 360 comprises a retention arm tail flap 390 extending from the retention arm tail distal end 370 at a predetermined angle (e.g., 0-degrees, 10-degrees, 45-degrees, 90-degrees, 120-degrees). In preferred embodiments, the retention arm tail flap 390 extends from the retention arm tail distal end 370 at a 90-degree angle. FIG. 10 illustrates an overhead perspective of the retention arm tail flap 390. The retention arm tail flap 390 is not limited to particular size dimensions. Referring to FIG. 7, upon insertion of a threaded fastener 110 into a push-in nut fastener 100 secured within a panel opening 170, the retention arm tail flap 390 is in contact with the panel lower surface 180. Contacting the panel lower surface 180 with the retention arm tail flap 390 increases the securing of the push-in nut fastener 100 with the panel 160. Additionally, contacting the panel lower surface 180 with the retention arm tail flap 390 permits push-in nut fasteners 100 to be secured with panel openings 170 with protruding rims (discussed in more detail below).

Referring to FIG. 1, the retention arm 150 has a retention arm plane 400. Referring to FIG. 5, upon insertion of the push-in nut fastener 100 with the panel opening 170, the retention arm plane 400 is located beneath the planar surface plane 250 and the panel plane 220. In particular, the retention arm plane 400 is in an approximately diagonal alignment (e.g., 45-degree angle) with the planar surface plane 250 and the panel plane 220.

In some preferred embodiments, as shown in FIG. 5, the retention arm 150 provides a deflection force as a threaded fastener 110 is inserted into a push-in nut fastener 100 secured in a panel opening 170. In particular, a threaded fastener 110 advancing through the sleeve 130 contacts the distal end of the retention arm 150 causing the retention arm 150 to deflect away from the threaded fastener 110. Deflection of the retention arm 150 causes an increase in the angle between the planar surface proximal end 240 and the retention arm 150. Additionally, deflection of the retention arm 150 causes the retention arm tail 360 to contact the panel lower surface 180. In particular, as the retention arm 150 is deflected away from the threaded fastener 110, the retention arm tail 360 contacts the panel opening proximal end 180 with a constant tension. As such, deflection of the retention arm 150 results in an increased securing of the push-in nut fastener 100 with the panel 160. The constant contact tension between the retention arm 150 and the panel opening proximal end 180 prevents loosening of the fit between the push-in nut fastener 100 and the panel 160 over time.

In other preferred embodiments, as shown in FIG. 7, the retention arm 150 provides a deflection force as a threaded fastener 110 is inserted into a push-in nut fastener 100 secured in a panel opening 170. In particular, a threaded fastener 110 advancing through the sleeve 130 contacts the distal end of the retention arm 150 causing the retention arm 150 to deflect away from the threaded fastener 110. Deflection of the retention arm 150 causes an increase in the angle between the planar surface proximal end 240 and the retention arm 150. Additionally, deflection of the retention arm 150 causes the retention arm tail flap 390 to contact the panel lower surface 180. In particular, as the retention arm 150 is deflected away from the threaded fastener 110, the retention arm tail flap 390 contacts the panel opening proximal end 180 with a constant tension. As such, deflection of the retention arm 150 results in an increased securing of the push-in nut fastener 100 with the panel 160. The constant contact tension between the retention arm 150 and the panel opening proximal end 180 prevents loosening of the fit between the push-in nut fastener 100 and the panel 160 over time. Additionally, securing the retention arm 150 with the retention arm tail flap 390, as opposed to the retention arm tail 360, provides a gap between the retention arm proximal flap 320 and the retention arm tail 360. The protruding rim of a panel opening 170 fits within the gap between the retention arm proximal flap 320 and the retention arm tail 360. As such, in preferred embodiments, the push-in nut fastener 100 is secured within panel openings 170 with protruding rims.

Figure 11:
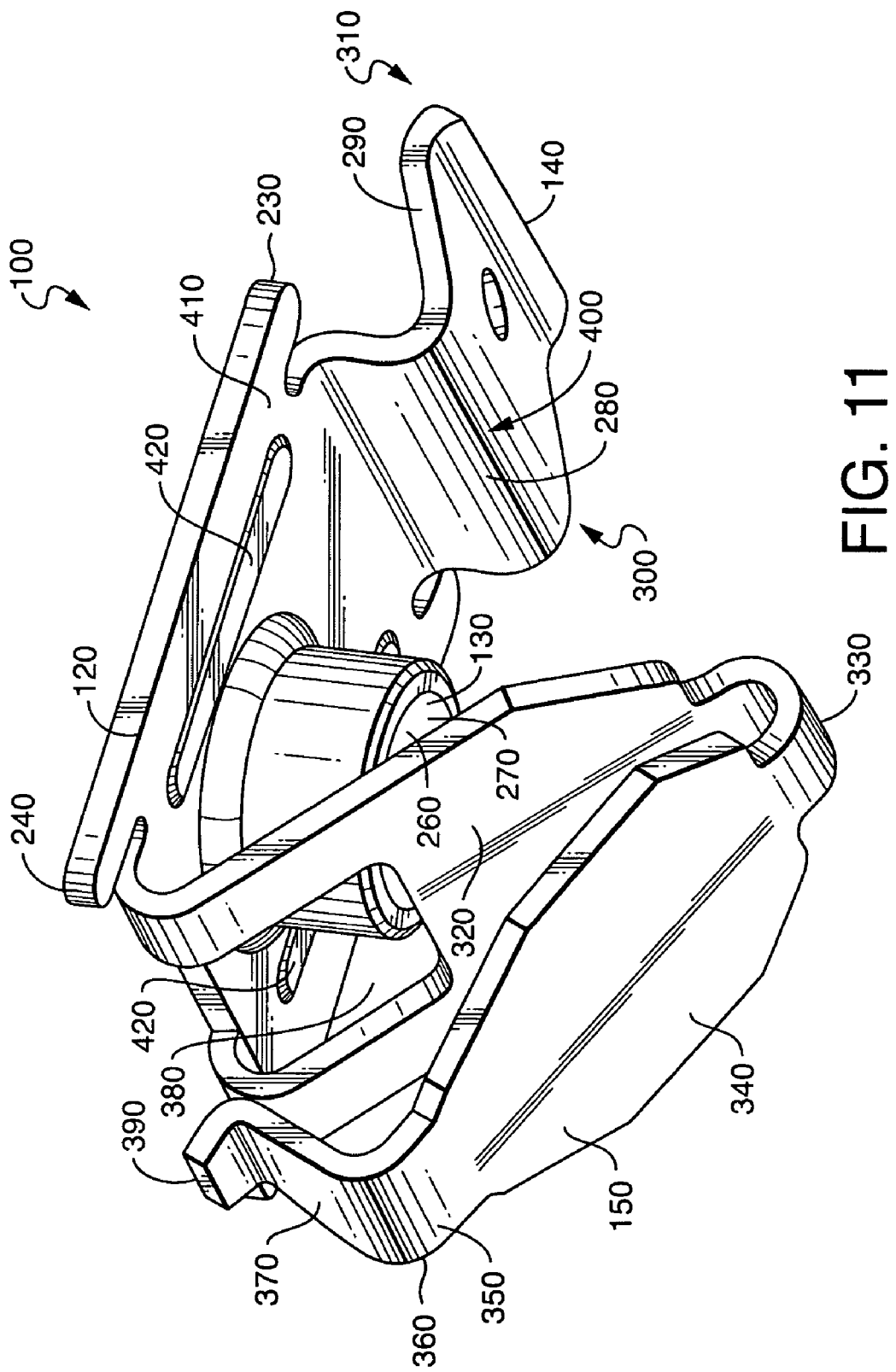
FIG. 11 illustrates a push-in nut fastener embodiment from a bottom up perspective.

FIG. 11 illustrates a bottom view of a push-in nut fastener embodiment. As shown, the push-in nut fastener 100 comprises a planar surface 120 comprising a planar surface distal end 230 and a planar surface proximal end 240, a sleeve 130 comprising a sleeve opening 260 and a sleeve axis 270, a cantilever 140 comprising a cantilever downwardly extending member 280, a cantilever horizontal member 290, a cantilever downwardly extending member plane 300, a horizontal member plane 310, a retention arm 150 comprising a retention arm proximal flap 320, a retention arm proximal flap distal end 330, a retention arm distal flap 340, a retention arm distal flap distal end 350, a retention arm tail 360, a retention arm tail distal end 370, and a retention arm plane 400.

Still referring to FIG. 11, the planar surface 120 further comprises a planar surface bottom surface 410. The planar surface bottom surface 410 comprises at least one strength rib 420 (e.g., a set of stiffening beads). The present invention is not limited to a particular type of strengthening ribs 420. The strengthening ribs 420 are not limited to a particular length or width. In some embodiments, a set of strength ribs 420 may be positioned at any location along the planar surface bottom surface 410. In preferred embodiments, two sets of strength ribs 420 are laterally positioned along the planar surface bottom surface 410 on each side of the sleeve 130 such that each set of strength ribs 420 extends from the planar surface distal end 230 to the planar surface proximal end 240. Upon insertion of the push-in nut fastener 100 into a panel, the strengthening ribs 420 function to maintain the integrity of the push-in nut fastener 100 as a whole (e.g., function to prevent the planar surface 120 from bowing).

Figure 12:
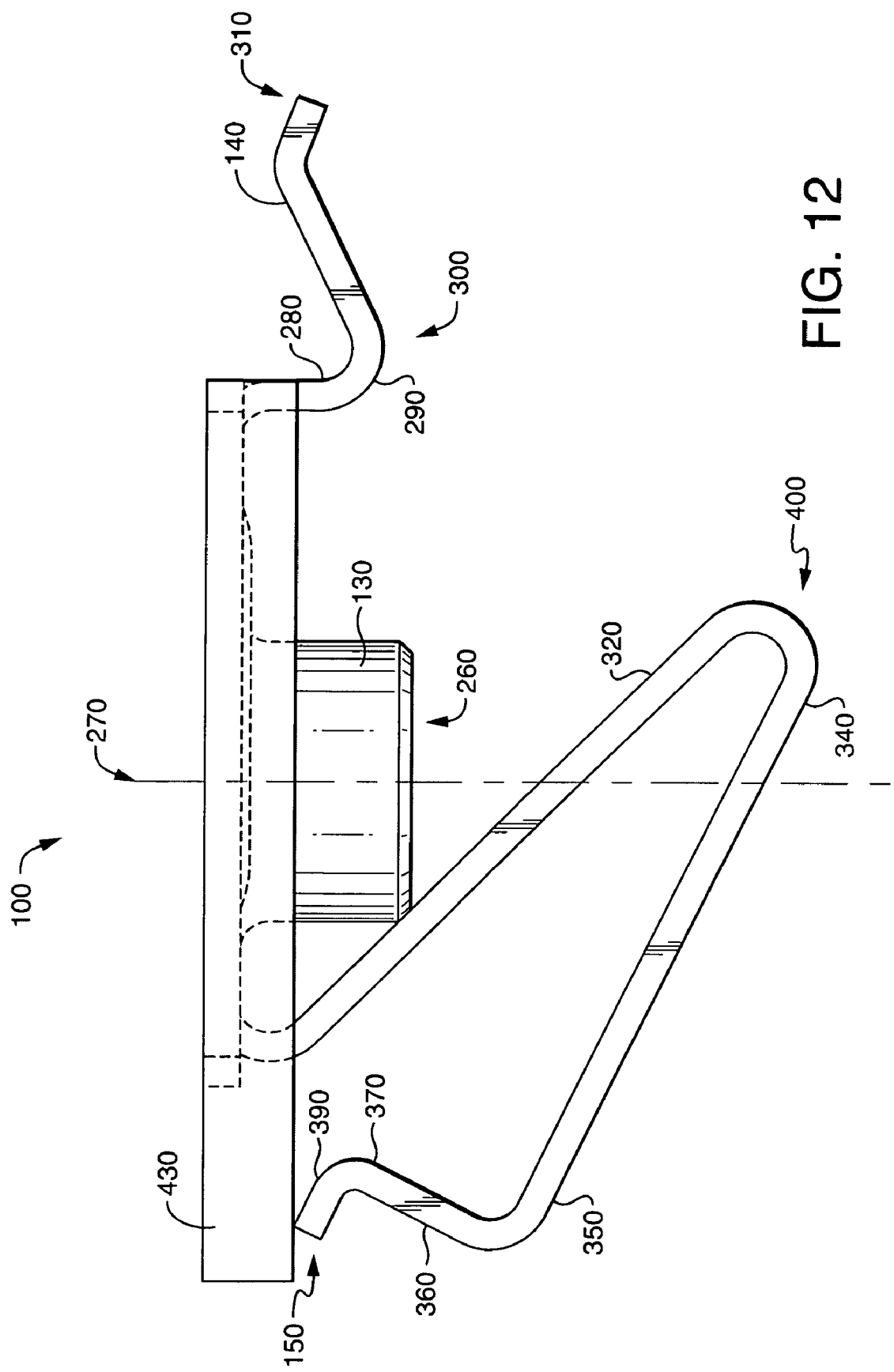
FIG. 12 illustrates a side view of a push-in nut fastener embodiment.

FIG. 12 illustrates a side view of a push-in nut fastener embodiment. As shown, the push-in nut fastener 100 comprises a sleeve 130 comprising a sleeve opening 260 and a sleeve axis 270, a cantilever 140 comprising a cantilever downwardly extending member 280, a cantilever horizontal member 290, a cantilever downwardly extending member plane 300, a horizontal member plane 310, a retention arm 150 comprising a retention arm proximal flap 320, a retention arm proximal flap distal end 330, a retention arm distal flap 340, a retention arm distal flap distal end 350, a retention arm tail 360, a retention arm tail distal end 370, a retention arm tail flap 390, and a retention arm plane 400.

Still referring to FIG. 12, a panel padding 430 encompasses the upper and lower surfaces of the planar surface planar surface including the planar surface distal end, planar surface proximal end, planar surface plane, and the planar surface bottom surface. The panel padding 430 is not limited to a particular material (e.g., plastic, rubber, foam, or mixture thereof). In preferred embodiments, the material of the panel padding 430 is plastisol. The panel padding 430 is not limited to particular size dimensions. In preferred embodiments, the panel padding 430 extends beyond the planar surface proximal end and above the retention arm tail flap 390. In preferred embodiments, the panel padding 430 is molded upon the planar surface such that the sleeve opening 260 remains exposed.

Figure 13:
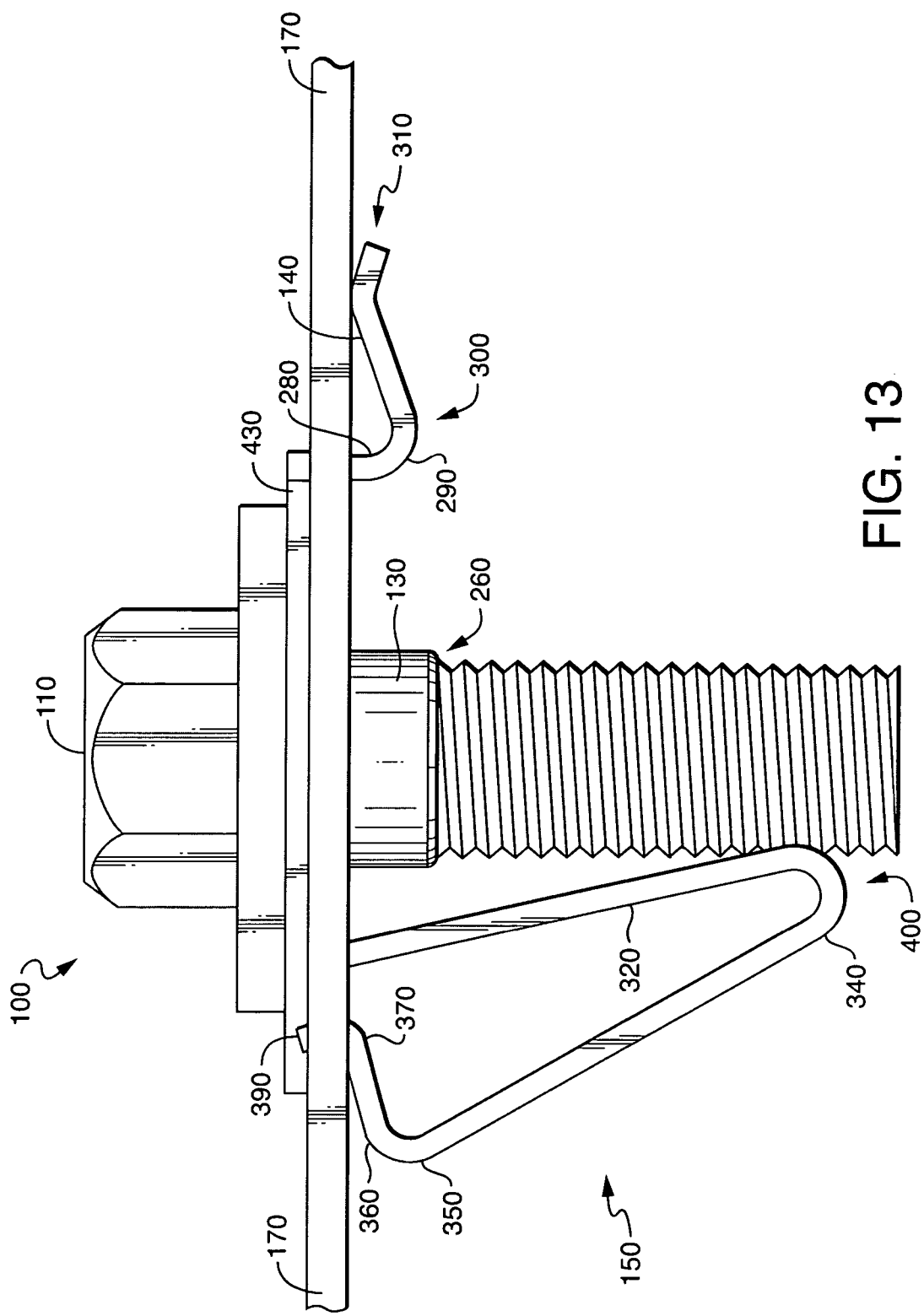
FIG. 13 illustrates a side view of a threaded fastener within a push-in nut fastener secured in a panel opening.

FIG. 13 illustrates a side view of a threaded fastener within a push-in nut fastener secured in a panel opening. As shown, the push-in nut fastener 100 comprises a panel padding 430 encompassing the upper and lower surfaces of the planar surface planar surface including the planar surface distal end, planar surface proximal end, planar surface plane, and the planar surface bottom surface, a sleeve 130 comprising a sleeve opening 260 and a sleeve axis 270, a cantilever 140 comprising a cantilever downwardly extending member 280, a cantilever horizontal member 290, a cantilever downwardly extending member plane 300, a horizontal member plane 310, a retention arm 150 comprising a retention arm proximal flap 320, a retention arm proximal flap distal end 330, a retention arm distal flap 340, a retention arm distal flap distal end 350, a retention arm tail 360, a retention arm tail distal end 370, a retention arm tail flap 390, and a retention arm plane 400.

Still referring to FIG. 13, upon insertion of a threaded fastener 110, the panel padding 430 is positioned between the panel 170 and the head of the threaded fastener 110 such that the head of the threaded fastener 110 is prevented from contacting the panel 170. As such, in preferred embodiments, the panel padding 430 raises the head of the threaded fastener 110 off of the panel 170. In preferred embodiments, the positioning of the panel padding 430 serves to provide a watertight seal between the threaded fastener 110 and the panel 170. In preferred embodiments, the positioning of the panel padding 430 serves to dampen potential rattling sound between the threaded fastener 110 and the panel 170.

Still referring to FIG. 13, in preferred embodiments, the panel padding 430 further engages the retention arm flap 390 positioned at the edge of the panel opening 170. As such, the panel padding 430 serves to secure the retention arm flap 390 with the edge of the panel opening 170 (e.g., serves to prevent the retention arm flap 390 from snapping beneath the panel opening 170). By preventing the retention arm flap 390 from snapping beneath the edge of the panel opening 170, the push-in nut fastener 100 may be used in panels with very thin thickness measurements (described in more detail below).

Still referring to FIG. 13, in preferred embodiments, securing the retention arm flap 390 with the edge of the panel opening 170 provides a compression force within the retention arm distal flap 340 so as to prevent rattling of the push-in nut fastener 100 in the absence of an inserted threaded fastener 110. Additionally, in preferred embodiments, securing the retention arm flap 390 within the edge of the panel opening 170 provides improved pull out performance of the push-in nut fastener 100.

Still referring to FIG. 13, upon insertion of a threaded fastener 110, the panel padding 430 the positioning of the panel padding 430 permits the push-in nut fastener 100 to be secured within a panel 170 having sections of varied thickness (e.g., panel thickness ranges between 0.7 mm to 1.8 mm). As such, in preferred embodiments, push-in nut fasteners 100 comprising a panel padding 430 are especially applicable for use in panels 170 having varied thickness sections (e.g., a door panel having a section with a thickness of 0.70 mm and a thickness of 1.8 mm in a different section; "tailor welding").

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

The invention claimed is:

1. A push-in nut fastener, comprising:
a planar surface with proximal and distal ends;
a sleeve extending from said planar surface, said sleeve including an axis extending through a center thereof and substantially perpendicular to said planar surface, said sleeve being substantially cylindrical and adapted to receive a mating fastener therein;
a cantilever integral with said planar surface and extending away from said planar surface distal end, said cantilever including a cantilever downwardly extending member integral with and extending from said distal end of said planar surface, and a cantilever horizontal member extending from said cantilever downwardly extending member in a direction away from said axis; and
a retention arm integral with said planar surface, said retention arm having a proximal end near said planar surface and a distal end spaced away from said proximal end and said planar surface, said retention arm extending from said planar surface proximal end so that said retention arm is positioned at least partially beneath said sleeve, such that at least a portion of said retention arm extends across said axis, wherein upon insertion of said push-in nut fastener into an opening, said cantilever is first positioned into the opening to provide a leverage force for subsequent insertion of said retention arm into the opening, and wherein said retention arm is deflectable by the fastener inserted into said sleeve such that an end of the fastener non-threadably engages said retention arm at a first location between said proximal and distal ends of said retention arm to cause said retention arm to move in a direction away from said axis, wherein the engagement between the fastener and said retention arm prevents that portion of said retention arm engaged by the end of the fastener from at anytime moving back in a direction to again extend across said axis, such that upon complete insertion of the fastener into said sleeve, the fastener engages said retention arm at a second location which is closer to said distal end of said retention arm than said first location, wherein the end of the fastener that non-threadably engages said retention arm at said first location is in continuous engagement with said retention arm as the fastener moves from said first location to said second location.

2. The push-in nut fastener of claim 1, wherein said sleeve comprises internal threads that receive a threaded fastener.

3. The push-in nut fastener of claim 1, wherein said sleeve is approximately perpendicular to said planar surface.

4. The push-in nut fastener of claim 1, wherein said push-in nut fastener is formed from sheet metal.

5. The push-in nut fastener of claim 4, wherein said sheet metal is spring steel.

6. The push-in nut fastener of claim 1, wherein said cantilever extends beyond the distal end of said planar surface.

7. A push-in nut fastener for insertion into a panel opening within a panel having upper and lower surfaces, said push-in nut comprising:
a planar surface having proximal and distal ends;
a sleeve extending outwardly from and beyond said planar surface, said sleeve including an axis extending through a center thereof and substantially perpendicular to said planar surface, said sleeve being substantially cylindrical and adapted to receive a mating fastener therein, such that said sleeve includes a constant, unchanging cross-dimensional shape from top to bottom thereof prior to and after receiving the mating fastener therein;
a cantilever integral with said planar surface and extending away from said planar surface distal end, said cantilever including a cantilever downwardly extending member integral with and extending from said distal end of said planar surface, and a cantilever horizontal member extending from said cantilever downwardly extending member in a direction away from said axis; and
a retention arm integral with said planar surface proximal end, said retention arm having a proximal end near said planar surface and a distal end spaced away from said retention arm proximal end and said planar surface, said retention arm having a flat planar member extending continuously between said proximal and distal ends of said retention arm, said retention arm extending from said planar surface proximal end at an angle so that said retention arm is positioned at least partially beneath said sleeve in such a way that said distal end of said retention arm extends across said axis, so that when said push-in nut is inserted into said panel opening, said cantilever is first positioned into said panel opening to provide a leverage force for subsequent insertion of said retention arm into said panel opening, and said retention arm engages said lower surface of said panel to secure said retention arm proximal end of said push-in nut fastener in said panel, wherein said retention arm is deflectable by the fastener inserted into said sleeve such that an end of the fastener non-threadably engages said retention arm to cause said retention arm to move in a direction away from said axis, wherein the engagement between the fastener and said retention arm prevents that portion of said retention arm engaged by the end of the fastener from at anytime moving back in a direction to again extend across said axis.

8. The push-in nut fastener of claim 7, wherein said push-in nut is formed from sheet metal.

9. The push-in nut fastener of claim 7, wherein said sheet metal is spring steel.

10. The push-in nut fastener of claim 7, wherein said sleeve is approximately perpendicular to said planar surface.

11. The push-in nut fastener of claim 7, wherein said sleeve comprises internal threads that receive a threaded fastener.

12. The push-in nut fastener of claim 7, wherein said cantilever is curvilinear.

13. The push-in nut fastener of claim 7, wherein deflection of said retention arm increases the angle between said planar surface and said retention arm.

14. The push-in nut fastener of claim 7, wherein said retention arm extends toward said planar surface distal end.

15. A push-in nut fastener for insertion into a panel opening within a panel having upper and lower surfaces, said push-in nut comprising:
- a planar surface with proximal and distal ends, wherein said planar surface contacts said upper surface of said panel to prevent said push-in nut fastener from being displaced through said panel opening;
- a sleeve extending outwardly from said planar surface, wherein said sleeve comprises multiple internal threads to secure said threaded fastener, and wherein said sleeve includes an axis extending through a center thereof and substantially perpendicular to said planar surface;
- a cantilever extending away from said planar surface and in a direction away from said axis, wherein said cantilever provides a leverage force against said lower surface of said panel upon insertion of said push-in nut fastener into said panel opening; and
- a retention arm integral with and extending away from said planar surface proximal end, said retention arm having a first portion located at least partially below said sleeve and a second portion that extends across said axis, said retention arm extending at a constant angle from said planar surface proximal end at least as defined as between said first and second portions of said retention arm, wherein upon insertion of said push-in nut fastener into said panel opening said planar surface engages said upper surface of said panel and said cantilever engages said bottom surface of said panel and thereby providing leverage for insertion of said proximal end of said push-in nut fastener and said retention arm into said panel opening so that said retention arm engages said lower surface of said panel and wherein said retention arm is deflectable by non-threaded engagement with an end of the threaded fastener inserted into said sleeve so as to move away from and no longer extend across said axis at anytime while engaged by said fastener, and so that said retention arm exerts pressure against said threaded fastener and said lower surface of said panel.

16. A push-in nut fastener, comprising:
- a planar surface with proximal and distal ends;
- a sleeve extending from said planar surface, said sleeve having an axis extending through a center thereof and perpendicular to said planar surface;
- a cantilever extending away from said planar surface;
- a retention arm integral with said planar surface and extending from said planar surface proximal end so that said retention arm is positioned at least partially beneath said sleeve, such that at least a portion of said retention arm extends across said axis, said retention arm further comprising a retention arm proximal flap extending away from said planar surface proximal end, a retention arm proximal flap distal end extending from said retention arm proximal flap, a retention arm distal flap extending from said retention arm proximal flap distal end and back toward said planar surface, and a retention arm tail flap extending from said retention arm distal flap, such that a portion of said retention arm proximal flap, said retention arm proximal flap distal end, and a portion of said retention arm distal flap each extend across said axis while positioned beneath said sleeve, wherein upon insertion of said push-in nut fastener into an opening said retention arm tail flap engages an edge defining said opening.

17. The push-in nut fastener of claim 16, wherein said planar surface comprises a padding material.

18. The push-in nut fastener of claim 17, wherein said padding material is plastisol.

19. The push-in nut fastener of claim 16, said planar surface comprising at least one strength rib.

20. The push-in nut fastener of claim 16, wherein said sleeve comprises internal threads that receive a threaded fastener.

21. The push-in nut fastener of claim 16, wherein said sleeve is approximately perpendicular to said planar surface.

22. The push-in nut fastener of claim 16, wherein said push-in nut fastener is formed from sheet metal.

23. The push-in nut fastener of claim 22, wherein said sheet metal is spring steel.

24. The push-in nut fastener of claim 16, wherein said cantilever extends beyond the distal end of said planar surface.

25. The push-in nut fastener of claim 16, wherein said retention arm is deflectable by a threaded fastener inserted into said sleeve.

26. The push-in nut fastener of claim 16, wherein said engaging of said retention arm tail flap with said opening prevents rattling of said push-in nut fastener.

* * * * *